A. H. GRANT.
CHAIN TOOL.
APPLICATION FILED JUNE 11, 1920.

1,429,731. Patented Sept. 19, 1922.

Inventor:
Alexander H. Grant
By Fred Gerlach
his Atty

Patented Sept. 19, 1922.

1,429,731

UNITED STATES PATENT OFFICE.

ALEXANDER H. GRANT, OF CHICAGO, ILLINOIS.

CHAIN TOOL.

Application filed June 11, 1920. Serial No. 388,304.

*To all whom it may concern:*

Be it known that I, ALEXANDER H. GRANT, a citizen of the United States, and a resident of Chicago, in the county of Cook and State of Illinois, have invented certain new and useful Improvements in Chain Tools, of which the following is a full, clear, and exact description.

The invention relates to chain tools and its object is to provide a tool which is simple in construction and by which two ends of a broken chain may be held together for reconnection. Also a tool of this character which may be folded together for convenience in carrying or transporting it.

The invention consists in the several novel features hereinafter set forth and more particularly defined by claims at the conclusion hereof.

Figure 1:
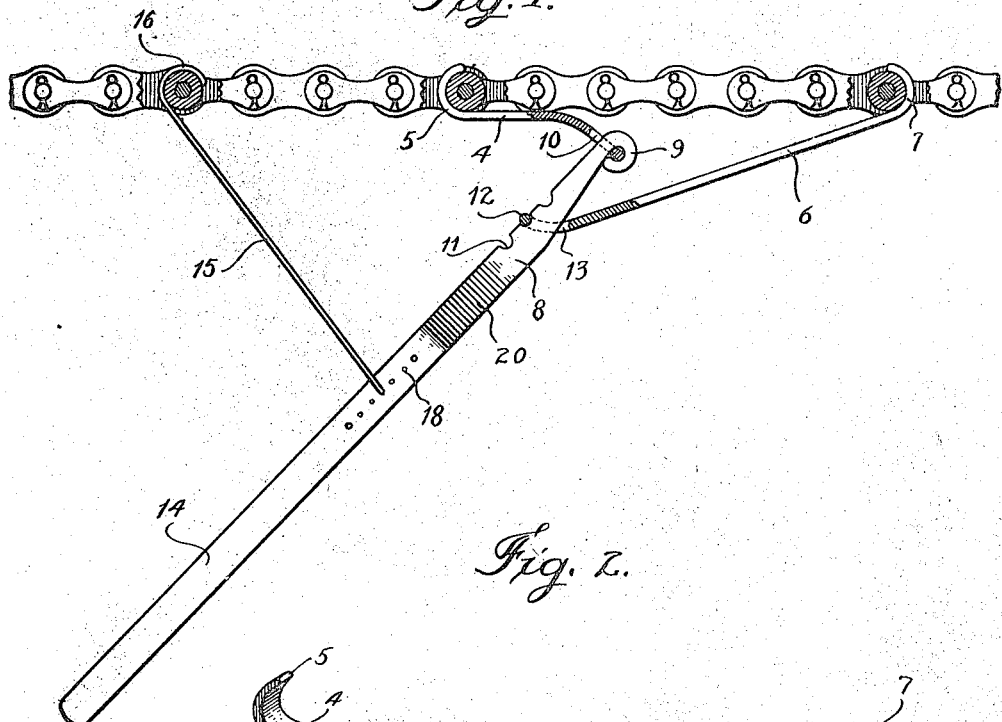
Figure 2:
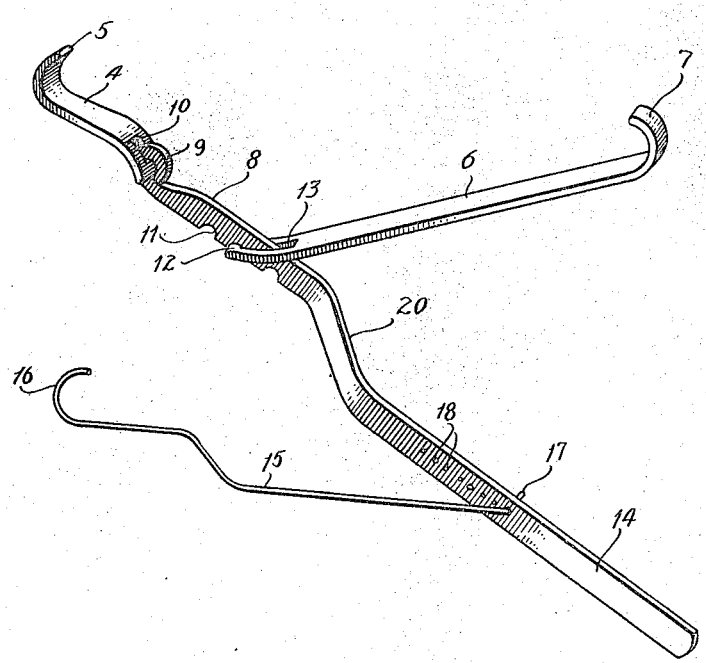

In the drawings: Fig. 1 is a side elevation, parts being shown in section of a device embodying the invention. Fig. 2 is a perspective.

The improved tool comprises a member 4 which is provided with a curved terminal 5 which forms a seat to receive and hold one member of a link chain, a member 6 formed with a curved terminal 7 forming an opposed seat for engaging and holding a link adjacent the other end of a broken or disconnected chain. Said lever is provided at one end with an ear 9 extending through a slot 10 in member 4 to form a pivotal connection between the lever and said member. The lever 8 is also provided adjacent one edge with a series of notches or seats 11 adapted to receive a pivot 12 on the inner end of member 6, the lever 8 being formed so that it will pass through a slot 13 in the member 6 to permit the pivot 12 to be adjusted into either of the seats 11. The outer end of lever 8 is provided with a handle 14.

In the operation of the tool, the terminal 5 of member 4 is placed into engagement with one of the links adjacent one end of a disconnected chain and the terminal 7 is placed into engagement with one of the links adjacent the other end. The pivot 12 of member 6 is then placed in one of the notches 11 and the handle of the lever 8 is then swung to the left which will force the terminals 5 and 7 to tighten the chain and bring the end links into position to be connected. A locking member 15 is provided with a hook 16 adapted to engage a link of the chain and an angular terminal 17, adapted to be passed through one of any of the perforations 18 in the lever 8, serves to hold the lever 8 in operative position so that both hands of the operator will be free to assist in connecting the ends of the chain. Obviously, the tool may be used to disconnect the chain by like manipulation.

By forming a slot 13 in the member 6, through which the lever is adapted to slide, said member and lever may be entirely disconnected so that they may be laid or stored side by side in a tool box. When the tool is not in use and member 6 had been disconnected, member 4 may be swung into position indicated by dotted lines in Fig. 1. The locking device 15 may be disconnected from the lever by withdrawing terminal 17 from the perforation 18. When thus disassembled, the entire tool may be conveniently placed in a tool box.

The purpose of providing a series of notches 11 is to vary the operative stroke of the lever according to the movement necessary to bring the links of the chain into proper relation. Lever 14 is bent, as at 20, so that the handle 14 will be offset with respect to the plane of the chain to make the handle more conveniently accessible for manipulation.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a chain tool, the combination of a pair of members provided with opposed seats for engaging links of a chain respectively, a lever between said members, adapted to force said seats together, a hook to engage a link of this chain for locking the lever to secure the members in operative position and an adjustable connection between the hook and the lever.

2. A chain tool comprising a pair of members having opposed seats therein to engage links of a chain, a lever, a pivotal connection between one of the members and the lever, and an adjustable pivotal connection between the other member and the lever comprising a slot through which the lever extends and which permits disengagement of the pivotal connection and the longitudinal shift of the lever through the slot.

3. A chain tool comprising a pair of members having opposed seats therein to engage links of a chain, a lever and a pivotal connection between one of the members and the lever, the lever being provided with notches in one edge, the other member being provided with a pivot pin adapted to be placed into one of the notches.

4. A chain tool comprising a pair of members having opposed seats therein to engage links of a chain, a lever and a pivotal connection between one of the members and the lever, the lever being provided with notches in one edge, the other member being provided with a pivot pin adapted to be placed into one of the notches and separable from the lever.

ALEXANDER H. GRANT.